US011942720B2

(12) United States Patent
Buchanan et al.

(10) Patent No.: US 11,942,720 B2
(45) Date of Patent: Mar. 26, 2024

(54) CABLE CONNECTION

(71) Applicant: Siemens Energy Global GmbH & Co. KG, Munich (DE)

(72) Inventors: Jordan Buchanan, Ulverston (GB); Christopher Burrow, Ulverston (GB); Daniel Walton, Carnforth (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 122 days.

(21) Appl. No.: 17/694,788

(22) Filed: Mar. 15, 2022

(65) Prior Publication Data

US 2022/0302634 A1 Sep. 22, 2022

(30) Foreign Application Priority Data

Mar. 17, 2021 (GB) ...................................... 2103663
Mar. 17, 2021 (GB) ...................................... 2103664
Mar. 17, 2021 (GB) ...................................... 2103666
Mar. 17, 2021 (GB) ...................................... 2103667
Mar. 17, 2021 (GB) ...................................... 2103668
Mar. 17, 2021 (GB) ...................................... 2103669

(51) Int. Cl.
*H01R 13/523* (2006.01)
*H01R 13/24* (2006.01)
(Continued)

(52) U.S. Cl.
CPC ....... *H01R 13/523* (2013.01); *H01R 13/2421* (2013.01); *H01R 13/2471* (2013.01); *H01R 13/502* (2013.01); *H01R 13/5202* (2013.01); *H01R 13/5219* (2013.01); *H01R 13/5227* (2013.01); *H01R 13/533* (2013.01); *H01R 13/6271* (2013.01); *H01R 13/629* (2013.01);
(Continued)

(58) Field of Classification Search
None
See application file for complete search history.

(56) References Cited

U.S. PATENT DOCUMENTS 3,742,427 A 6/1973 Ballard
4,072,381 A * 2/1978 Burkhart .............. H01R 13/504
439/604

(Continued)

FOREIGN PATENT DOCUMENTS

| | | | |
|---|---|---|---|
| FR | 2895577 | A1 | 6/2007 |
| GB | 2338119 | A | 12/1999 |
| WO | 2021037949 | A1 | 3/2021 |

*Primary Examiner* — Tho D Ta
(74) *Attorney, Agent, or Firm* — Wolter Van Dyke Davis, PLLC

(57) ABSTRACT

A dry mate cable connection includes a data cable. The data cable includes a plurality of electrical conductors and at least one electrically insulating outer layer surrounding each data conductor, whereby the data conductors are electrically insulated from one another. The cable includes a termination end. The outer layer of each conductor is physically in contact with an outer layer of an adjacent conductor, except at the termination end. The plurality of electrical conductors at the termination end are physically separated from one another by a single electrically insulating overmoulded cable termination housing. The housing is in contact with at least part of the electrically insulating layers of each of the electrical conductors.

14 Claims, 4 Drawing Sheets

(51) Int. Cl.

| | |
|---|---|
| ***H01R 13/502*** | (2006.01) |
| ***H01R 13/52*** | (2006.01) |
| ***H01R 13/533*** | (2006.01) |
| ***H01R 13/627*** | (2006.01) |
| ***H01R 13/629*** | (2006.01) |
| ***H01R 24/86*** | (2011.01) |
| *H01R 13/622* | (2006.01) |
| *H01R 13/66* | (2006.01) |

(52) U.S. Cl.
CPC ....... *H01R 13/62961* (2013.01); *H01R 24/86* (2013.01); *H01R 13/622* (2013.01); *H01R 13/6675* (2013.01); *H01R 2201/04* (2013.01); *H01R 2201/26* (2013.01)

(56) References Cited

U.S. PATENT DOCUMENTS

| | | | | |
|---|---|---|---|---|
| 4,142,770 | A | 3/1979 | Butler, Jr. et al. | |
| 6,464,405 | B2 | 10/2002 | Cairns et al. | |
| 7,285,003 | B2 * | 10/2007 | Cairns .................. | H01R 13/521 439/353 |
| 8,251,732 | B2 * | 8/2012 | Armacost ............ | H01R 13/745 439/903 |
| 10,014,678 | B2 | 7/2018 | Barrett et al. | |
| 10,704,353 | B2 | 7/2020 | Painter et al. | |
| 2007/0259568 | A1 | 11/2007 | Mackillop et al. | |

* cited by examiner

CABLE CONNECTION

CROSS REFERENCE TO RELATED APPLICATIONS

This application claims the benefit of United Kingdom Application Nos. GB 2103663.7, GB 2103664.5, GB 2103666.0, GB 2103667.8, GB 2103668.6, GB 2103669.4 all filed on 17 Mar. 2021, and all incorporated by reference herein in their entirety.

FIELD OF INVENTION

This invention relates to a cable connection, in particular a dry-mate cable connection for a subsea, or underwater, connector and associated method.

BACKGROUND OF INVENTION

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. Subsea connectors have various applications including power connectors which supply power to subsea equipment, or control and instrumentation connectors which exchange data between different pieces of subsea equipment, or between subsea equipment and topside devices.

SUMMARY OF INVENTION

In accordance with a first aspect of the present invention, a dry mate cable connection comprises a data cable, the data cable comprising a plurality of electrical conductors and at least one electrically insulating outer layer surrounding each data conductor, whereby the data conductors are electrically insulated from one another; wherein the cable comprises a termination end; wherein the outer layer of each conductor is physically in contact with an outer layer of an adjacent conductor, except at the termination end; and, wherein the plurality of electrical conductors at the termination end are physically separated from one another by a single electrically insulating overmoulded cable termination housing, the housing being in contact with at least part of the electrically insulating layers of each of the electrical conductors.

The solderless connection of the present invention reduces cost in assembly and enables quick and convenient termination of a data cable into the back of a controls connector. The normally in-contact outermost insulating outer layers are physically separated from one another at the termination end by the overmoulded cable termination housing.

Each of the electrical conductors may protrude beyond the end of each of their electrically insulating layers and the electrically insulating overmoulded cable termination housing.

The single housing may be fitted around the electrically insulating layer of each of the plurality of conductors.

The cable termination housing may comprise individual extensions, extending, at least partially, over the electrically insulating layer of each physically separated conductor in the termination end and sealingly engaged with an outer surface of the insulating layer of each core.

The cable termination housing may comprise a mixture of direct guide holes and surface grooves to receive each core. Feeding one core of each pair over a surface groove prevents pairs of cores from overlapping.

The electrically insulated conductors in the cable may be surrounded by an electrical screening layer, except at the termination end.

Each electrical conductor in the cable may be paired with an adjacent electrical conductor and only at the termination end physically separated from its adjacent electrical conductor.

Each conductor pair may be arranged to be located orthogonal to an adjacent conductor pair and all the orthogonal pairs form a data cluster, to correspond to an arrangement of conductor contacts of a data cluster in a plug or receptacle back end of a subsea connector to which the cable is to be connected.

The data cables typically comprise twisted pair cables and the electrical conductors from each twisted pair in the cable are separated out and arranged to mirror the location of electrical contacts in a plug or receptacle back end, so that the cable connection can be simply push fit into the plug or receptacle back end. This cable management arrangement allows for faster termination and assists with cable sealing.

The cable termination housing may comprise a face seal for sealing against a corresponding sealing surface of a data cluster housing in the back end of the plug or receptacle.

The cable connection may further comprise an electrical screen bridging the cable termination housing and the cable behind its termination end.

This assists with earth screen management.

The data cable may comprise at least two and in particular four twisted pair cables.

The length of the twisted pairs at the termination end that are untwisted may be chosen such that the untwisted length does not exceed 30 mm.

The data cable may comprise an Ethernet cable, or other digital or analogue cable meeting subsea instrumentation interface standards.

The data cable may comprise a gel filled cable.

The gel blocks water ingress and at pressure fills interstices between individual conductors, so minimizing air entrapment, improving performance. The gel may be an insulating gel.

In accordance with a second aspect of the present invention, a subsea connector assembly comprises one of a plug part or a receptacle part, the plug part or the receptacle part further comprising a dry mate cable connection according to any preceding claim.

BRIEF DESCRIPTION OF THE DRAWINGS

An example of a dry mated cable connection and associated method in accordance with the present invention will now be described with reference to the accompanying drawings in which.

DETAILED DESCRIPTION OF INVENTION

Figure 1:
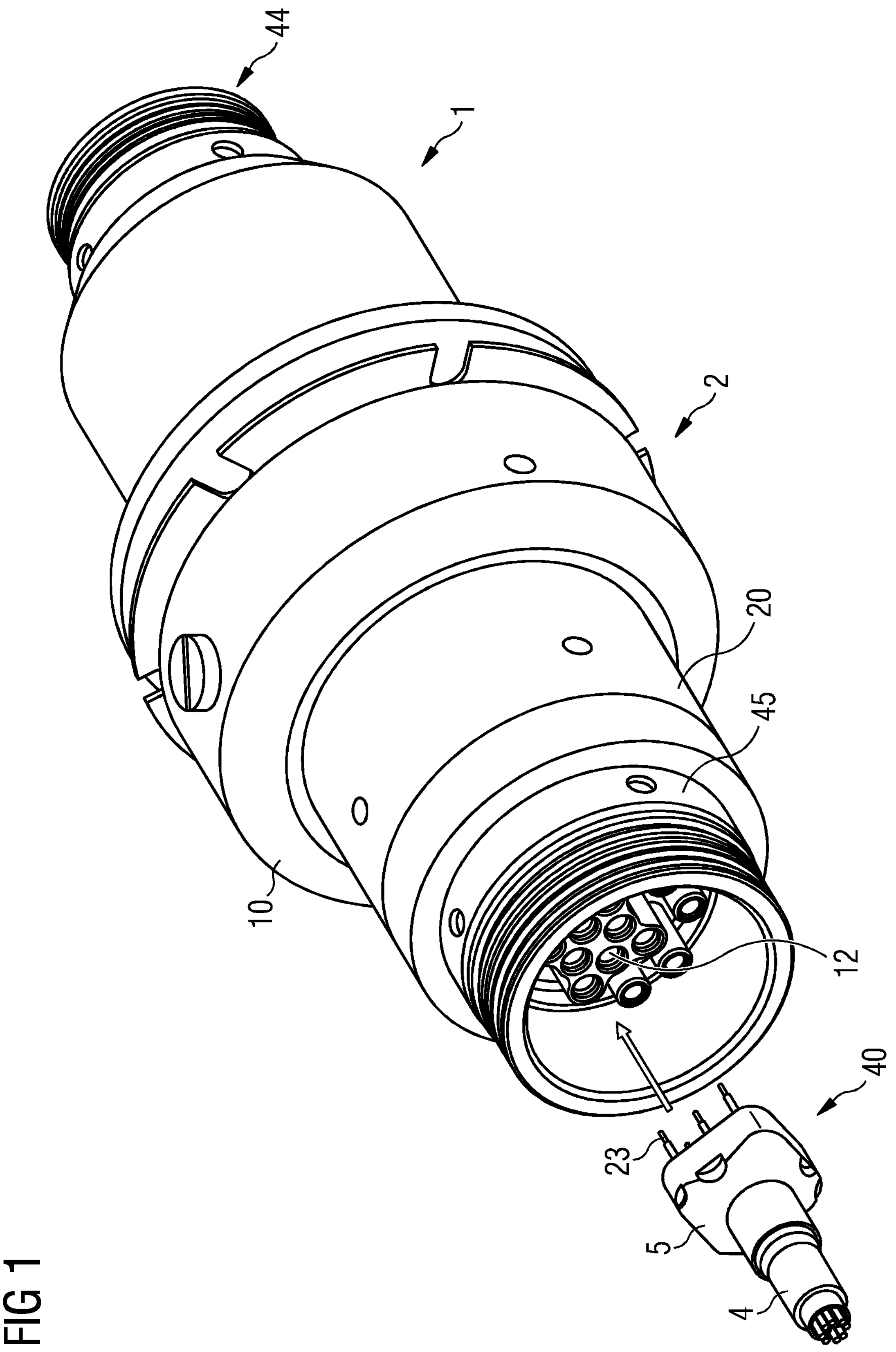
FIG. 1 illustrates a dry mate cable connection according to the present invention, for attachment to a partially mated plug/receptacle of a subsea connector.

The drive to reduce overall lifecycle costs, both capital expenditure (CAPEX) and operational expenditure (OPEX), associated with new deep-water oil and gas developments means that improvements to existing designs, manufacturing processes and operation are desirable. Subsea connector systems are desired that have a lower cost, can be relatively quickly and easily installed and that have reduced maintenance requirements, or need for intervention which affects the systems to which they are connected throughout their working life. Thus, connectors which continue to perform without degradation, over a longer period of time, are desirable.

Typically, connectors for different applications may be single or multi-way connectors. For example, a 4-way connector may be used for delivering power, or a 12-way connector for data transfer via a suitable subsea instrumentation interface standard. This may be level 1, for analogue devices, level 2 for digital serial devices, e.g CANopen, or level 3. using Ethernet TCP/IP. Other data connectors, include optical fibre connectors. Wet mateable controls connectors typically have large numbers of thin conductor pins, in order that multiple control signals to different parts of a product can be included in a single control cable. For example, multiple subsea sensors on different pieces of equipment, such as flow sensors, temperature sensors, or pressure sensors each need to have a separate communication path, so that they can be interrogated, monitored and if necessary, actuators can be energized, for example to open or close a valve, or to start or stop a pump. Power transmission may be required for the purpose of supplying power to subsea equipment to enable it to operate, for example to close a valve, or drive a pump. Wet mateable power connectors may have a single pin and socket arrangement, or may be multi-way connectors, but typically with fewer, larger, pins than a control or communications connector.

Conventionally, connections between conductive cores of a data communications cable and contacts of a connector back end have involved soldering of electrical connections and potting of the cable for retention. The present invention addresses this problem by providing a compact quick communications connection, in particular for termination of a multi-core communications cable, such as an ethernet cable, or other suitable subsea cable, into the back of a controls connector. By incorporating an overmoulded sealing or cable management housing, beneath an electrical screening cap component, a termination is provided which can be pushed into the back end of a matching controls connector. The connector parts comprise a plug with plug backend and receptacle with receptacle backend, the plug backend being a mirror image of the receptacle back end, shown in the examples.

This design of cable management has benefits of convenience, termination speed, cable sealing and earth screen management. A cable is coupled to a termination connection by a dry mate on the termination end of the cable, so that the complete cable and connection combination can be plugged onto the back end of the wet mate connector, either the plug or receptacle part. A typical ethernet data cable has eight cores and these have to break out of the cable to make electrical connections with contacts in the plug or receptacle front end, each conductor core connecting separately with each contact. A face seal between the housing and the back end and cone seals formed in extensions of the housing, seal to each contact in the back end, so that the whole cable assembly is sealed.

Data communication cables are typically screened to reduce electrical crosstalk and twisted pairs, rather than straight line cables are preferred to reduce pick up of noise and interference. In making the dry mate connection on the cable, it is important to minimize disturbance of the twisted pairs of the cable. This is done by reducing the length of untwisted cable, so there is less interference from straight lines picking up noise. The amount of untwisting needed in the design is about ⅓ to ½ the amount that would normally be required for a soldered connection. Having been fitted into the connector back end, the cone seals around the conductor cores may be compressed when located, to seal against sea water ingress. The cable is provided with an earth screen around the outside of all of the cable cores and an extension electrical earth screen may be fitted outside the connection termination housing, so as to ensure earth screen electrical continuity. An additional shield may be swaged on between them.

To produce a high speed data connector it is necessary that impedance, measured at any position along the length of the connector and termination to the cables, is consistent and matched to the cable value. Typically for the Ethernet standard, an impedance of 100Ω is chosen, but for other types of data cable, this may be different. The impedance occurring at any position through the connector and cable is typically related to capacitance and inductance, which should stay as near as possible uniform themselves, to achieve uniformity of impedance. In subsea operation, this can be a challenge, so subsea connectors are designed to avoid step changes of impedance inside the connector and hence minimize insertion losses and return losses, which may degrade the quality and strength of data reaching the receiving end of a system. As can be understood from the connector design hereinbefore described, the plug and receptacle inserts are designed with careful pin spacing, controlled dielectric and uniformity in distance from an earth screen. Subsea connectors may have relatively large gaps between inserts, so these gap regions are configured to perform sealing and compensating functions whilst maintaining impedance matching. A combination of features contribute to effective impedance matching, including minimizing the extent to which the twisted pairs are untwisted by reducing the length of breakout, setting the pairs of cables to have an orthogonal pitch and reducing the overall connector length.

A cable termination for terminating communications or data conductors in the back of a controls connector is described in these examples. The connector may comprise data connectors only, or be a hybrid connector, containing dedicated data conductors, such as Ethernet, as well as power conductors. The data connector typically comprises at least 4 data conductors, more typically 8 data conductors, but may have as many as 12 data conductors. A hybrid power and data connector typically comprises up to 4 power conductors in addition to the up to 8 data conductors, but the precise number of power and data conductors needed depends upon the protocol used and whether single or three phase power is used, so the invention is not limited to such a combination. Improvements to a conductor connector include reduced cost and lead time, as well as improved communications performance, such as improved data bandwidth.

FIG. 1 shows an example of a dry mate cable connection 40 according to the present invention in context with a partially mated plug/receptacle pair. The cable connection is illustrated as it is brought into contact with a back end 45 of the receptacle 2 for attachment to a partially mated plug 1 and receptacle 2. The connection comprises a data cable 4 onto which a break out termination housing (not shown) supports individual cable conductors 23 and is provided with an outer electrical earth shield 5, to extend the shielding provided around the outside of the cable 4. A further earth shield may be provided around the data cluster 20, which extends into the receptacle body 10. In the back end 45 of the receptacle 2, contacts 12 coat the inside of openings in the receptacle pins (not shown). A plug back end 44, which is a mirror image of the receptacle back end 45 can be seen at the far end of the plug part 1.

Figure 2:
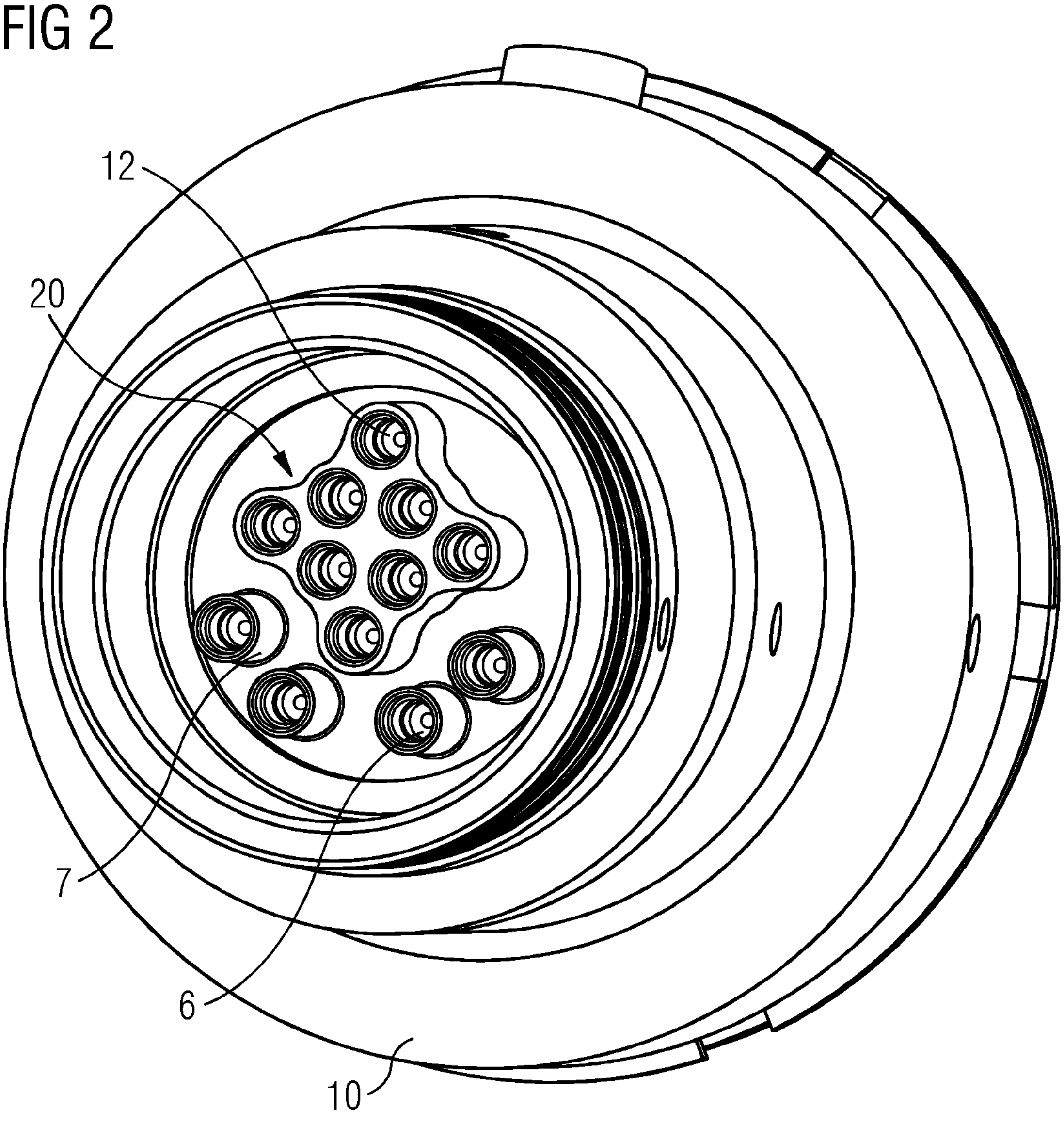
FIG. 2 illustrates more detail of the back end of a receptacle having both communications and power connections, into which a dry mate cable connection of the present invention may be fitted.

FIG. 2 show more detail of the contacts in the receptacle back end 45. In this example of a hybrid communications and power connector, the contacts 12 are arranged in pairs, each pair being orthogonal to an adjacent pair, the four pairs shown, forming a data cluster 20. Individually power conductors 6, in this example four conductors, comprise an insulating layer 7. The power conductors 6 are spaced from one another and from the data cluster 20 in the receptacle body 10. The spacing also helps to protect the data conductors from interference from the power conductors.

Figure 3:
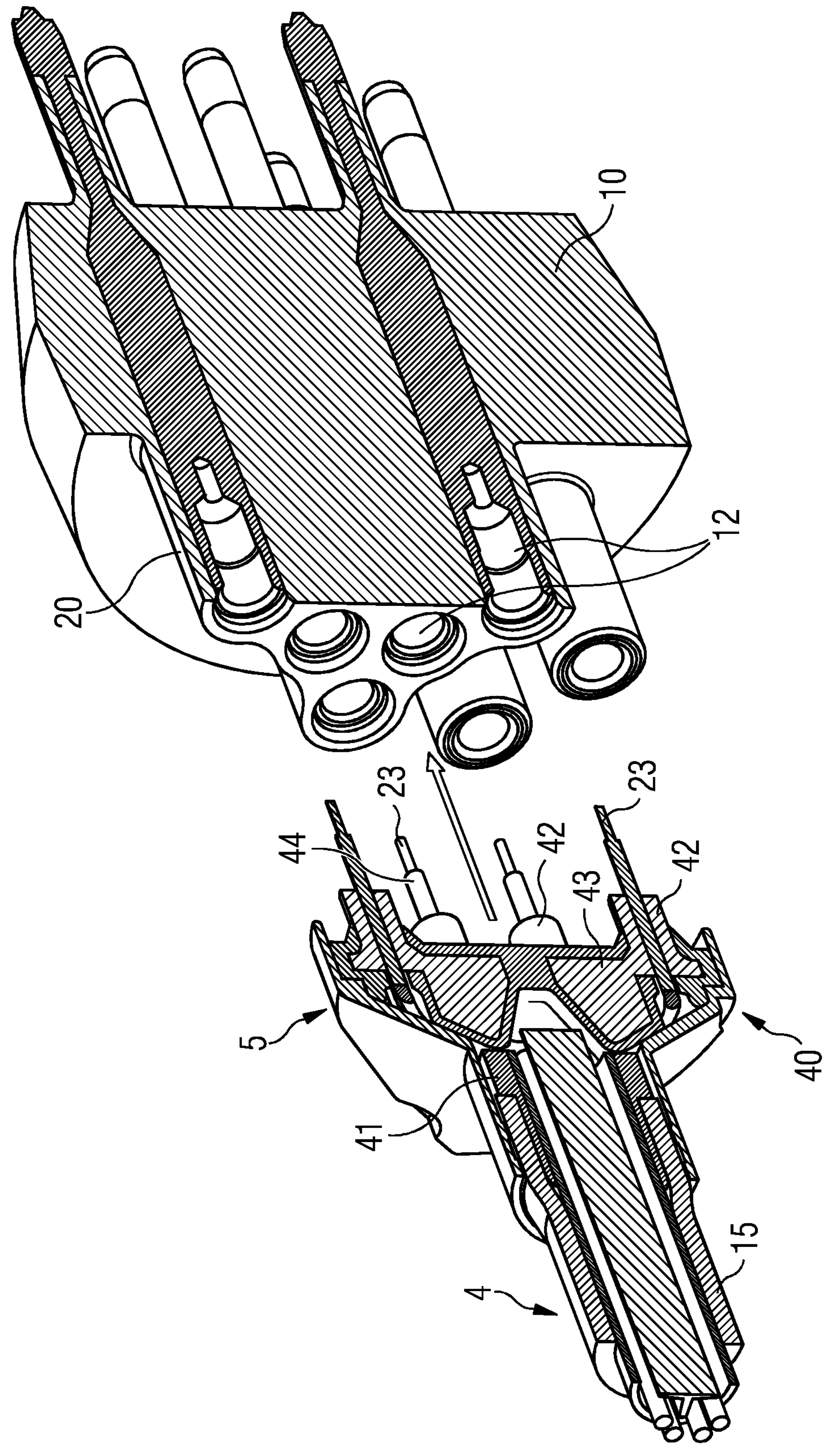
FIG. 3 shows a section through a dry mate cable connection according to the present invention; and, FIG. 4 illustrates an example of a dry mate cable connection according to the present invention, before connection to a receptacle back end, with the connection earth screen removed, showing the cable routing.

FIG. 3 provides a section through the cable connection 40 and the receptacle body 10. The cable 4 typically comprises an outer insulating layer and an outer earth screen, the space between the insulating layer and earth screen being filled with a gel. The gel is typically an electrical insulator, although its primary purpose is to exclude water. Beneath the earth screen layer, an inner insulating sheath surrounds a plurality of twisted pair data cores, each being individually insulated from one other by an insulating layer or coating. The cable connection comprises a moulded body 43 with openings acting as guide holes for each individual core. The guide holes are formed in an arrangement that corresponds with a layout of openings of a data cluster in the receptacle (or plug) back end. This arrangement is designed to pair the individual cores and also locate each pair such that they are orthogonal with an adjacent pair of cores. Optionally, there may be inner guide holes and outer guide grooves, whereby half of the cores, typically, one of each twisted pair for an Ethernet cable, are led by grooves on top of the overmoulded body 43 to guide holes at the edge of the body, rather than all being fed directly down through the guide holes. This helps to increase the separation of individual cores to get them to be substantially parallel as they exit the body, as well as preventing pairs from overlapping one another. The overmoulded body may be formed with either left handed or right handed curvature for the grooves, to enable use with either plug or receptacle.

The moulding of this body includes extension seals, or cone seals, 42 on the other side of the guide holes, formed to support the cable conductor cores 23 separately and substantially parallel to one another after they have been broken out from the cable pairs and straightened to fit through the openings. The cone seals 42 in combination with the silicone overmoulding top or side surfaces convey a seal from the cable outer jacket underneath an earth shield cap 5 onto the back of the receptacle body data cluster. The cables sit inside this umbrella. The earth shield cap 5 surrounds the overmoulded body and its separated cable cores. The electrical earth screen 5 is connected to the earth screen 15 of the cable 4 via a conductive swage support or continuity bush 41. Typically, the housing can be slid over the stripped cables and sits in contact with the outer insulating layer of each wire of the twisted pair cable, when fitted.

Figure 4:
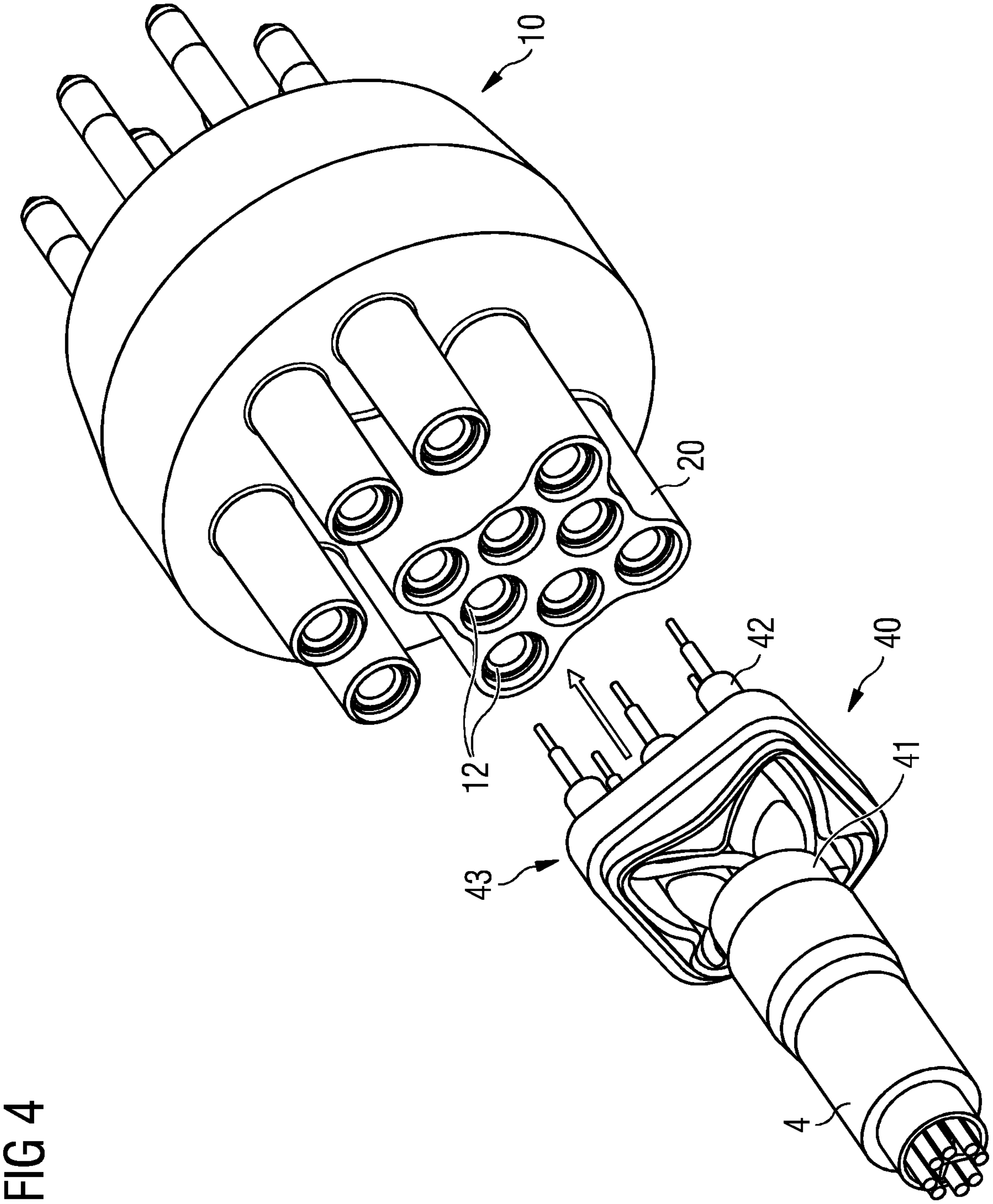

FIG. 4 illustrates the cable connection 40 with the earth shield cap 5 removed, showing the cable routing from the break out of the cable 4 to the individual conductor cores 23 ready to be inserted in the receptacle body back end. The extent of the untwisting and separation of each pair, one from the other, is kept to a minimum by retaining a degree of rotation from their original relative location within the cable.

The present invention provides a dry mate cable connection comprising a data cable and a cable termination housing. The data cable comprises a plurality of electrical conductors and at least one electrically insulating outer layer surrounding each data conductor. The insulating layer or layers ensure that the data conductors are electrically insulated from one another, along all of their length and the outermost layers of insulation are in contact with the outermost layer of an adjacent conductor. At a termination end of the cable, each conductor is spaced out by the cable termination housing, so that the outer layers at the termination end are not in direct physical contact. Instead, the electrical conductors at the termination end are physically separated from one another by the cable termination housing, which is an electrically insulating overmoulded cable termination housing, fitted over each electrically insulating layer. The housing is mounted, such that at its mounting point, the housing is in contact with the electrically insulating layer of each wire, rather than any part of the electrical conductor that is exposed when the electrical insulation is stripped from the ends of the wires. Parts of the housing that are not in direct contact with the electrical insulation may extend further. This cable termination housing with the individual cable conductors mounted therein makes solderless connection of the conductor cores to electrical contacts in the back end of a plug or receptacle part of a wet mate connector possible. Assembly costs are reduced by deskilling the connection step, compared to soldering. Thus, termination of a data cable into the back of a controls connector can be done more quickly and easily. Cables with terminations can be pre-prepared and taken from stock as needed. The terminations can be done on site, rather than having to be done in a factory, because all the testing of the parts is done as part of the assembly process and the final step of crimp free, solder free, termination of the cable can be completed without further testing.

The cable termination housing may comprise individual extensions, extending, at least partially, over the electrically insulating layer of each physically separated conductor in the termination end and sealingly engaged with an outer surface of the insulating layer. For example, the extensions may be cone shaped such that they make a cone seal when mated to the back of the connector. The entry to the backend of each conductor 12 on the plug or receptacle is a mismatched cone which seals against the extensions when mated. The electrically insulated conductors in the cable are typically surrounded by an electrical screening layer, except at the termination end. This screening layer may be extended over the termination housing to the plug or receptacle back end in various ways, to provide electrical continuity. The cable connection may further comprise an electrical screen bridging the cable termination housing and the cable behind its termination end to assist with earth screen management.

Each electrical conductor in the cable is paired with an adjacent electrical conductor, typically as a twisted pair and only at the termination end are these conductors separated from one another. The distance over which the pairs are separated is kept as small as possible by using the termination housing, so rather than the twisted pairs being unwound by about 60 mm to make a solder connection, the conductors may only be separated over a distance of 20 mm to 30 mm. The data cable may comprise at least two and more particularly, four twisted pair cables, for example an Ethernet data cable. The data cable may be gel filled.

Each conductor pair is arranged to be located orthogonal to an adjacent conductor pair and all the orthogonal pairs form a data cluster to correspond to an arrangement of conductor contacts of a data cluster in a plug or receptacle back end of a subsea connector to which the cable is to be connected. In this way, the electrical conductors from each twisted pair in the cable are separated out and arranged to mirror the location of electrical contacts in a plug or receptacle back end, so that the cable connection can be simply push fit into the plug or receptacle back end, with no further opening out or rearrangement. This cable management arrangement allows for faster termination and assists with cable sealing.

The cable termination housing may comprise a face seal for sealing against a corresponding sealing surface of a data cluster housing in the back end of the plug or receptacle of the connector. The housing seals use flat seals in compression and cones to seal the gel filled cable from the connector plug or receptacle backend. The cable termination housing manages conductor routing and preserves pair twist for as long as possible before the critical break out region. The examples have been described with respect to a plug or receptacle back end, and the conductor routing may be left-hand or right-hand conductor routing, i.e., for plug or receptacle laterally inverted arrangements. The cable termination design has provision to manage earth screening of the break-out region to reduce induced electrical noise, whilst achieving a simple dry mate push in arrangement, which can make eight simultaneous connections, for an 8 core cable. Wiring or configuring the cable and cable termination is done outside of the connector backend, simplifying the activity. It would be possible to create two back to back identical connector harnesses (i.e., not laterally inverted, plug/plug, rec./rec. conductor routing using the cable termination housing of the present invention, but it is less than ideal as 2 pairs of conductors have to cross over each other in the break out region, in the backend of one connector. In practice, this requirement may be met by incorporating a non-standard wiring configuration in one of the connectors.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A dry mate cable connection, comprising:

a data cable, the data cable comprising a plurality of electrical conductors and at least one electrically insulating outer layer surrounding each electrical conductor of the plurality of electrical conductors, whereby the electrical conductors are electrically insulated from one another;

wherein the data cable comprises a termination end;

wherein the at least one electrically insulating outer layer surrounding each electrical conductor comprises an outermost electrically insulating layer, and wherein the outermost electrically insulating layer of each electrical conductor is physically in contact with the outermost electrically insulating layer of an adjacent electrical conductor, except at the termination end;

wherein the plurality of electrical conductors at the termination end are physically separated from one another by a single electrically insulating overmoulded cable termination housing, the single electrically insulating overmoulded cable termination housing being in contact with at least part of the outermost electrically insulating layer of each of the electrical conductors; and wherein each of the electrical conductors protrudes beyond an end of its respective outermost electrically insulating layer and beyond the single electrically insulating overmoulded cable termination housing.

2. The dry mate cable connection according to claim 1, wherein the single electrically insulating overmoulded cable termination housing is fitted around the outermost electrically insulating layer of each of the plurality of electrical conductors.

3. The dry mate cable connection according to claim 1, wherein the single electrically insulating overmoulded cable termination housing comprises individual extensions, extending, at least partially, over the outermost electrically insulating layer of each physically separated electrical conductor in the termination end and sealingly engaged with an outer surface of the outermost electrically insulating layer of each electrical conductor.

4. The dry mate cable connection according to claim 1, wherein the plurality of electrical conductors in the data cable are surrounded by an electrical screening layer, except at the termination end.

5. The dry mate cable connection according to claim 1, wherein the single electrically insulating overmoulded cable termination housing comprises a face seal for sealing against a corresponding sealing surface of a data cluster housing in a back end of a plug or a receptacle.

6. The dry mate cable connection according to claim 1, further comprising an electrical screen bridging the single electrically insulating overmoulded cable termination housing and the data cable behind its termination end.

7. The dry mate cable connection according to claim 1, wherein the data cable comprises a gel filled cable.

8. A subsea connector assembly, comprising:
one of a plug part or a receptacle part,
the plug part or the receptacle part further comprising a dry mate cable connection according to claim 1.

9. The dry mate cable connection according to claim 1, wherein the plurality of electrical conductors comprises pairs of the electrical conductors, and only at the termination end are respective electrical conductors of each pair of the electrical conductors separated from each other.

10. The dry mate cable connection according to claim 9, wherein each pair of the electrical conductors is arranged to be located orthogonal to an adjacent pair of the electrical conductors to define respective orthogonal pairs, and all respective orthogonal pairs form a data cluster, to correspond to an arrangement of conductor contacts of a data cluster in a plug or a receptacle back end of a subsea connector to which the data cable is to be connected.

11. A dry mate cable connection, comprising:
a data cable comprising a plurality of electrical conductors and at least one electrically insulating outer layer surrounding each electrical conductor, whereby the electrical conductors are electrically insulated from one another;
wherein the data cable comprises a termination end;
wherein the at least one electrically insulating outer layer surrounding each electrical conductor comprises an outermost electrically insulating layer, and wherein the outermost electrically insulating layer of each electrical conductor is physically in contact with the outermost electrically insulating layer of an adjacent electrical conductor, except at the termination end;
wherein the plurality of electrical conductors at the termination end are physically separated from one another by a single electrically insulating overmoulded cable termination housing, the single electrically insulating overmoulded cable termination housing being in contact with at least part of the outermost electrically insulating layer of each of the electrical conductors; and
wherein the data cable comprises at least two twisted pair cables.

12. The dry mate cable connection according to claim 11, wherein a length of the at least two twisted pair cables at the termination end that are untwisted does not exceed a distance of 30 mm.

13. The dry mate cable connection according to claim 11, wherein the data cable comprises four twisted pair cables.

14. A dry mate cable connection, comprising:
a data cable comprising a plurality of electrical conductors and at least one electrically insulating outer layer surrounding each electrical conductor, whereby the electrical conductors are electrically insulated from one another;
wherein the data cable comprises a termination end;
wherein the at least one electrically insulating outer layer surrounding each electrical conductor comprises an outermost electrically insulating layer, and wherein the outermost electrically insulating layer of each electrical conductor is physically in contact with the outermost electrically insulating layer of an adjacent electrical conductor, except at the termination end;
wherein the plurality of electrical conductors at the termination end are physically separated from one another by a single electrically insulating overmoulded cable termination housing, the single electrically insulating overmoulded cable termination housing being in contact with at least part of the outermost electrically insulating layer of each of the electrical conductors; and
wherein the data cable comprises an Ethernet cable.

* * * * *